Jan. 19, 1960 R. M. GREEN 2,921,968
CRYSTAL PURIFICATION PROCESS AND APPARATUS
Filed June 3, 1955

INVENTOR.
R. M. GREEN
BY Hudson and Young
ATTORNEYS

United States Patent Office 2,921,968
Patented Jan. 19, 1960

2,921,968

CRYSTAL PURIFICATION PROCESS AND APPARATUS

Richard M. Green, Borger, Tex., assignor to Phillips Petroleum Company, a corporation of Delaware Application June 3, 1955, Serial No. 512,976

9 Claims. (Cl. 260—666)

This invention relates to separation and purification of components of liquid multi-component mixtures. In one of its aspects, it relates to separation and purification of liquid multi-component mixtures by fractional crystallization. In another of its aspects, it relates to fractional crystallization apparatus which includes means for controlling the operation of the column. In still another of its aspects, it relates to an improved method for controlling the operation of fractional crystallization apparatus.

The separation of chemical compounds by means of crystallization finds many applications in industrial installations. While many separations can be made by distillation or solvent extraction, there are cases where these methods are impracticable or impossible, and the desired separation can be effected more advantageously by means of crystallization. Thus, in the case of chemical isomers having similar boiling points and solubilities, or materials having relatively high boiling ranges, or thermally unstable substances, separation by crystallization may well be the only method which can be advantageously employed.

As well as offering in many cases perhaps the only practicable method of separation, the crystallization method offers the further advantage of being the only separation method which theoretically gives a pure product in a single stage of operation. In actual practice, however, the crystals obtained from a solution of several components will be impure because of the occlusion of mother liquor within the crystal interstices. In the conventional fractional crystallization processes, the crystal yield from one batch crystallization is redissolved in a solvent or remelted and again crystallized to effect further purification. The recrystallized product will have less impurity since the concentration of impurity in the new liquor is less than in the previous liquor of crystallization. Such processes require a large amount of equipment and floor space for their operation with resulting high operating expenditures in terms of labor and equipment costs. Furthermore, in these types of processes, the purity of the product is limited by the number of stages through which the process is carried.

A continuous method of separating and purifying liquid multicomponent mixtures has been recently proposed which overcomes the disadvantages of conventional fractional crystallization processes. In one embodiment, this method involves cooling a liquid multi-component mixture from which the separation is to be made so as to form crystals of at least one of the components and thereafter separating crystals from mother liquor in a pre-filter. The crystals are then introduced into a purification section in one end of which a melting zone is maintained. The crystals are moved through the purification section by means of a reciprocating porous piston toward the melting zone where the crystals are melted. A portion of the resulting melt is passed as a reflux stream countercurrently to the movement of the crystals in the purification section and in intimate contact therewith so as to displace occluded impurities. Displaced liquid comprising mother liquor and occluded impurities is passed through the porous piston and withdrawn from an upstream portion, with respect to crystal movement, of the purification section while a purified product is recovered from the melting zone. The present invention constitutes an improvement upon fractional crystallization apparatus which utilizes a pre-filter to separate mother liquor from a crystal slurry prior to introduction of the crystals into a purification column and which employs a porous piston as a crystal mover and as a pufrication column filtering means.

When practicing a fractional crystallization process as described above, it has been found that the efficiency of the pre-filter may in some cases be reduced and that in certain isolated instances stoppage of the pre-filter may result if introduction of liquid feed material and mother liquor filtration are allowed to occur during both the compression and backstrokes of the column piston. This is believed to be caused by the fact that during the compression stroke of the column piston a considerable back pressure is created within the pre-filter. Thus, filtering occurs under relatively high pressures causing packing of crystals within the filter. Because of the packing of the crystals, it becomes in certain cases difficult to move the crystals into the purification column and a filter stoppage may finally result. I have found that improved operation can be obtained if the period during which liquid feed material is introduced into the chiller and mother liquor is withdrawn from the pre-filter is synchronized with the movement of the column piston. Accordingly, in accordance with this invention, a method for operating a purification column is provided whereby the introduction of feed material and the withdrawal of mother liquor are controlled so as to occur preferably only during the backstroke of the column piston. By operating in this manner, the desired pre-filtering operation is accomplished only under relatively low pressures so that any tendency for the crystals to build up within the filter and thereby cause a filter stoppage is substantially eliminated.

The following are objects of the invention.

It is an object of the invention to provide improved fractional crystallization apparatus.

Another object of the invention is to provide an improved process for the separation and purification of components of liquid multi-component mixtures.

Still another object of the invention is to provide an improved method for operating a piston-type purification column having an in-line pre-filter and chiller associated therewith whereby the introduction of feed material into the chiller and withdrawal of mother liquor from the pre-filter is allowed to occur only during the backstroke of the column piston.

A further object of the invention is to provide a means and method for synchronizing the operation of a cooling means and a pre-filtering means with the operation of the crystal separation and purification column of fractional crystallization apparatus.

Still other objects and advantages of the invention will become apparent to those skilled in the art upon reference to the accompanying disclosure.

Broadly speaking, the present invention resides in improved fractional crystallization apparatus and in a method for operating such apparatus. In accordance with a broad aspect, when carrying out a separation process in a purification column provided with a porous piston as a crystal mover and having a chiller and an in-line pre-filter connected thereto, the improved method of this invention comprises introducing a liquid feed mixture into the chiller and withdrawing mother liquor from the pre-filter only during the backstroke of the column piston. During the compression stroke of the column piston, filtering is accomplished solely by means of the porous column piston. It has been found that by operating a pre-filter in the described manner, sufficient mother liquor can be removed from a slurry of crystals in mother liquor containing 20 to 25 percent solids so as to obtain a slurry containing from 60 to 70 percent solids. Furthermore, by introducing the feed mixture into the system and withdrawing mother liquor therefrom only during the backstroke of the column piston, it has been found that the thickened slurry can be moved through the pre-filter and into the purification column under the pressure supplied by the feed pump. By permitting filtering to occur only under feed pump pressure while the thickened slurry is flowing from the pre-filter into the purification column rather than continuously and during periods when the back pressure within the filter would be great it has been possible to eliminate the occurrence of filter stoppages.

The process and apparatus of this invention are applicable to a vast number of simple binary and complex multi-component systems. The invention is particularly applicable to the separation of hydrocarbons which have practically the same boiling points and are, therefore, difficult to separate by distillation. Where high boiling organic compounds are concerned, separation by distillation is often undesirable because many such compounds are unstable at high temperatures. One particularly advantageous application of the process lies in the purification of a component of, for example, 15 to 25 percent purity so as to effect a purity of 98 percent or higher. In order to illustrate some of the systems to which the invention is applicable, the following compounds are grouped with respect to their boiling points:

| Group A | B.P., °C. | F.P., °C. |
|---|---|---|
| Benzene | 80 | 5.5 |
| n-Hexane | 69 | −94 |
| n-Heptane | 98.52 | −90.5 |
| Carbon Tetrachloride | 77 | −22.8 |
| Acrylonitrile | 79 | −82 |
| Ethyl Alcohol | 78.5 | −117.3 |
| 2,2-Dimethylpentane | 79 | −125 |
| 2,3-Dimethylpentane | 86 | |
| Methyl ethyl ketone | 79.6 | −86.4 |
| Methylpropionate | 79.9 | −87.5 |
| Methyl acrylate | 80.5 | |
| 1,3-Cyclohexadiene | 80.5 | −98 |
| 2,4-Dimethylpentane | 80.8 | −123.4 |
| 2,2,3-Trimethylbutane | 80.9 | −25 |
| Cyclohexane | 81.4 | 6.5 |
| Acetonitrile | 82 | −42 |
| Cyclohexene | 83 | −103.7 |
| 2-Methylhexane | 90 | −119 |
| 3-Methylhexane | 89.4 | −119.4 |

| Group B | B.P., °C. | F.P., °C. |
|---|---|---|
| Methyl cyclohexane | 100.3 | −126.3 |
| Cyclohexane | 81.4 | 6.5 |
| n-Heptane | 98.52 | −90.5 |
| 2,2,4-Trimethylpentane (isooctane) | 99.3 | −107.4 |
| Nitromethane | 101 | −29 |
| p-Dioxane | 101.5 | 11.7 |
| 2-Pentanone | 101.7 | −77.8 |
| 2-Methyl-2-butanol | 101.8 | −11.9 |
| 2,3-Dimethylpentane | 89.4 | |
| 3-Ethylpentane | 93.3 | −94.5 |

| Group C | B.P., °C. | F.P., °C. |
|---|---|---|
| Toluene | 110.8 | −95 |
| Methylcyclohexane | 100.3 | −126.3 |
| 2,2,3,3-Tetramethyl butane | 106.8 | 104 |
| 2,5-Dimethylhexane | 108.25 | −91 |
| 2,4-Dimethylhexane | 110 | |
| 2,3-Dimethylhexane | 113.9 | |
| 3,4-Dimethylhexane | 116.5 | |
| 3-Ethyl-2-methylpentane | 114 | |
| 3-Ethyl-3-methylpentane | 119 | |

| Group D | B.P., °C. | F.P., °C. |
|---|---|---|
| Aniline | 184.4 | −6.2 |
| Toluene | 110.8 | −95 |
| Benzene | 80.0 | 5.5 |

| Group E | B.P., °C. | F.P., °C. |
|---|---|---|
| Carbon tetrachloride | 77 | −22.8 |
| Chloroform | 61 | −63.5 |
| CS$_2$ | 46.3 | −108.6 |
| Acetone | 56.5 | −95 |

| Group F | B.P., °C. | F.P., °C. |
|---|---|---|
| Ortho-xylene | 144 | −27.1 |
| Meta-xylene | 138.8 | −47.4 |
| Para-xylene | 138.5 | 13.2 |

| Group G | B.P., °C. | F.P., °C. |
|---|---|---|
| Ortho-cymene | 175.0 | −73.5 |
| Meta-cymene | 175.7 | <−25 |
| Para-cymene | 176.0 | −73.5 |

| Group H | B.P., °C. | M.P., °C. |
|---|---|---|
| Dimethyl phthalate | 282 | 5.5 |
| Dimethyl isophthalate | 124 (12 mm.) | 67 |
| Dimethyl terephthalate | 288 | 140.6 |

| Group I | B.P., °C. | M.P. °C. |
|---|---|---|
| Ortho-nitrotoluene | 222.3 | α−10.6, β−4.1 |
| Meta-nitrotoluene | 231 | 15.5 |
| Para-nitrotoluene | 238 | 51.3 |

Mixtures consisting if any combination of two or more of the components within any one of the groups can be resolved by the process of the invention, as can mixtures made up of components selected from different groups; for example, benzene can be separated from a benzene-n-hexane or a benzene-n heptane mixture in which the benzene is present in an amount greater than the eutectic concentration. In the same manner, para-xylene can be readily separated from a mixture of para- and meta-xylenes or from para-, meta-, or ortho-xylenes. Benzene can also be separated from a mixture thereof with toluene and/or aniline. Multi-component mixtures which can be effectively resolved so as to recover one or more of the components in substantially pure form include mixtures of at least two of 2,2-dimethylpentane, 2,4-dimethylpentane, 2,2,3-trimethylbutane, methyl cyclohexane, 2,2,4-trimethylpentane, and mixtures of at least two of carbon tetrachloride, chloroform, and acetone. The invention is also applicable to the separation of individual components from a system of cymenes.

This invention can also be utilized to purify naphthalene, hydroquinone, (1,4-benzenediol), paracresol, para-dichlorobenzene, and such materials as high melting waxes, fatty acids, and high molecular weight normal paraffins. The invention can also be used to resolve a mixture comprising anthracene, phenanthracene, and carbazole. Furthermore, the invention can be used to separate durene (1,2,4,5-tetramethylbenzene) from $C_{10}$ aromatics. In cases where the material to be purified has a relatively high crystallization point, the impure material is raised to a temperature at which only a portion of the mixture is in a crystalline state, and the resulting slurry is handled at such a temperature that operation is as described in connection with materials which crystallize at lower temperatures.

It is not intended, however, to limit the invention to organic mixtures, but rather it is applicable to inorganic mixtures as well, and offers a practical method of separating two inorganic components between which solvates or hydrates are formed. Examples of inorganic systems to which this invention is applicable are those for the recovery of pure salts, such as ammonium nitrate, and of anhydrous salts from their hydrates.

In certain cases, it is also desirable to recover mother liquor separated from the crystals as a product of the process. This situation arises where it is desired to increase the concentration of a dilute solution. This aspect of the invention is especially applicable to the production of concentrated food products which involves primarily the removal of water from these products. Accordingly, by utilizing the process of this invention, water can be removed from fruit juices such as grape, orange, lemon, pineapple, apple, tomato, etc. It is also possible to concentrate vegetable juices and beverages such as milk, beer, wine, coffee or tea by this method.

For a more complete understanding of the invention, reference may be had to the following description and the drawing, in which.

Figure 1:
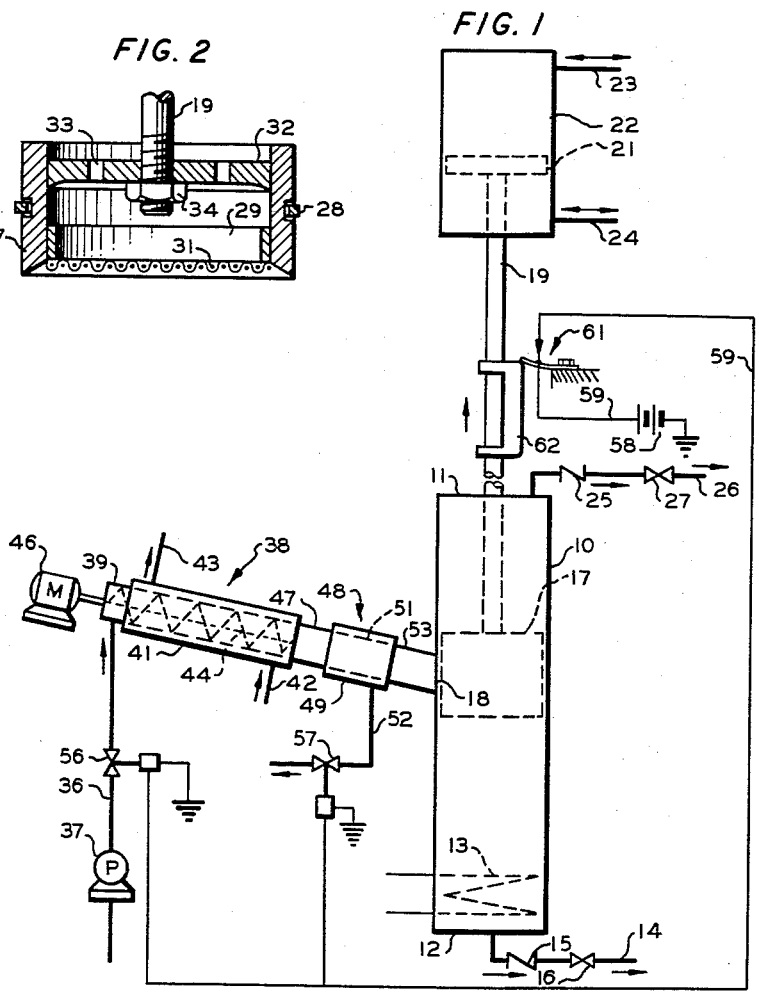
Figure 1 is an elevational view of fractional crystallization apparatus illustrating the present invention.

Referring now to Figure 1 of the drawing, the fractional crystallization apparatus of this invention comprises an elongated crystal purification column 10 closed at its upper and lower ends by closure members 11 and 12, respectively. A heating means is positioned in the lower end of column 10 in order to provide a crystal melting zone in that end of the column. As illustrated, the heating means is a coil 13 through which a heat transfer medium is circulated. It is not intended, however, to limit the invention to the specific heating means shown, for other suitable means may be employed. For example, an electrical heater may be positioned next to closure member 12, a coil may be disposed around column 10 at its lower end, or an electrical bayonet type heater may be provided to extend into the end of the column. A liquid outlet line 14 containing a check valve 15 and a flow control means, such as valve 16, is connected to the end of column 10 to provide means for removal of melt from the melting zone.

In the upper end of column 10, there is provided a porous piston 17 which functions both as a crystal compacting means and as a filtering means. Thus, piston 17 is adapted to permit the flow of liquid therethrough while at the same time preventing the passage of solid material. Piston 17 is of such a length that during part of its compression stroke, it completely blocks feed opening 18 while during a portion of its backstroke the opening into the column is unobstructed so as to permit flow of material into the column. Piston 17 is connected by means of connecting rod 19 to a hydraulic piston 21 disposed in hydraulic cylinder 22. By means of lines 23 and 24, hydraulic fluid is passed alternately into and out of cylinder 22 so as to drive piston 21 which in turn causes the movement of piston 17. Outlet line 26 containing a check valve 25 and a flow control means, such as valve 27, is connected to the upper end of column 10 to provide means for the withdrawal of liquid from that end of the column.

Figure 2:
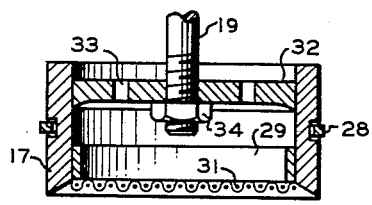
Figure 2 is a cross-sectional view of a porous piston.

Figure 2 of the drawing is a cross-sectional view of a porous piston which can be advantageously employed. As illustrated, the piston is provided with an expansible ring 28 which is adapted to fit the inner wall of the purification column. Piston 17 is equipped with a fixed ring 29 which holds a filtering screen 31 in position across the opening in the piston. Plate 32, which extends across the opening in the upper portion of the piston, contains perforations or openings 33 for passing liquid therethrough on the compression stroke of the piston. Piston rod 19 passes through plate 32 to which it is threaded and is further secured by means of a nut 34. Filter screen 31 is formed of brass or other non-corrodable material which may be covered with a suitable filtering fabric. It has been found, however, that wire screening of a fineness of 30 to 150 mesh permits liquid to pass while retaining crystals in the column in practically all applications. The principal requirement of the porous piston is that it be liquid-pervious and crystal-impervious under operating conditions.

Feed inlet line 36, leading from a source of feed material, not shown, and containing a pump 37, is connected to the inlet end of chiller 38. Chiller 38 comprises cylinder 39 surrounded by a jacket member 41. Lines 42 and 43 provide means for circulating a heat exchange fluid or refrigerant, such as expanding liquid propane, through the annular space formed between cylinder 39 and jacket member 41. Chiller 38 is equipped with an auger 44 which is connected to a motor 46 to provide means for scraping crystals from the inner walls of the chiller. While it is preferred to utilize a scraped surface chiller of the type described, it is to be understood that other refrigeration means for forming crystals, e.g., a direct refrigeration means, can be employed without departing from the scope of the invention.

A conduit 47 connects the delivery end of chiller 38 to the inlet end of filter 48. Filter 48, which serves as the pre-filter, is an in-line type filter and comprises a cylindrical member 49. A filter medium such as a substantially cylindrical filter screen 51 is disposed within and spaced apart from cylindrical member 49 so as to provide an annular space between the filter screen and the walls of the cylindrical member. Line 52 connected to cylindrical member 49 is for the withdrawal of mother liquor from the filter. Feed inlet conduit 53 connects the outlet end of filter 48 to an intermediate portion of a purification column 10. Chiller 38 and filter 48 are preferably disposed in an inclined position above the horizontal, as shown, but it is to be understood that they may be horizontally positioned without departing from the scope of the invention.

Figure 3:
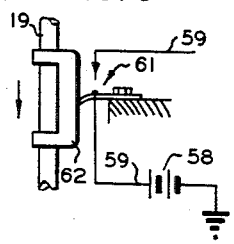
Figures 3 and 4 are partial elevational views of the apparatus of Figure 1 illustrating the operation of the control mechanism.
Figure 4:
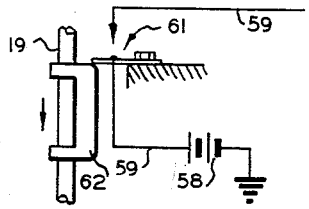

Feed inlet line 36 and mother liquor withdrawal line 52 are each provided with a flow control means which, as illustrated, are solenoid valves 56 and 57, respectively. Valves 56 and 57 are normally closed valves, i.e., they remain in a closed position except when their solenoids are energized. Electrical current to the solenoids of valves 56 and 57 is supplied by a source of current, such as battery 58, through electrical lead 59. Electrical lead 59 contains a switch 61 which is actuated on being contacted by cam member 62 rigidly attached to connecting rod 19. Figures 3 and 4, which illustrate the effect upon switch 61 of movement of cam 62, will be discussed more in detail hereinafter in conjunction with the description of the operation of the apparatus of Figure 1. The solenoids of valves 56 and 57 and the negative terminal of battery 58 are gounded as indicated in Figure 1. It is within the scope of the invention to provide pump 37 with a switching means responsive to the movement of cam 62 for starting and stopping the pump in which case valve 56 in line 36 can be omitted and a check valve installed in its place.

The electrical system described hereinabove constitutes means for synchronizing the movement of piston 17 with the introduction of feed material into chiller 36 and withdrawal of mother liquor from filter 48 during the operation of the fractional crystallization apparatus. It is to be understood that it is not intended to limit the present invention to the specific control means described for other means may be used which come within the spirit and scope of the invention. For example, it is within the contemplation of the invention to utilize a pneumatic control system rather than an electrical control system as described.

While the fractional crystallization apparatus of this invention has for the sake of clarity of understanding been illustrated and described as occupying a substantially vertical position, it is not intended to so limit the invention. It is to be understood that the apparaus can be otherwise disposed without departing from the spirit or scope of the invention. Thus, the separation and purification column can be positioned horizontally, or the column can be operated vertically with the melting zone in the top of the column rather than in the bottom as illustrated.

In describing the operation of the apparatus of Figure 1, it is assumed that piston 17 is at the beginning of its backstroke and that cam 62 has just made contact with switch 61 as shown in the figure. As a result of the closing of switch 61, electrical current from battery 58 flows through electrical lead 59 and energizes the solenoids of valves 56 and 57. Contact between the cam member and switch 61 preferably occurs at about the commencement of the backstroke of the column piston. Energizing of the solenoids of valves 56 and 57 causes these valves to be opened, and they remain in an open position so long as cam member 62 during the column piston backstroke is in contact with switch 61. And cam 62 is preferably constructed so as to maintain switch 61 in a closed position during the entire backstroke of the column piston.

During the period when valve 56 is in an open position, pump 37 pumps a liquid feed material, which may be a liquid multi-component mixture containing components of different melting points, from a source, not shown, into chiller 36. Chiller 36 is maintained at a temperature low enough to crystallize at least a portion of one of the components of the feed mixture and form a slurry of crystals in mother liquor. The crystal slurry so formed flows from the chiller through conduit 47 into filter 48. In filter 48 mother liquor is separated from the crystal slurry and withdrawn through conduit 52. As noted above, valve 57 in line 52 is in an open position and remains in this position during the backstroke of piston 17 so as to allow mother liquor to be withdrawn during this period. The thickened crystal slurry, formed as a result of the removal of mother liquor, is passed from filter 48 under pressure exerted by feed pump 37 through inlet conduit 53 into crystal purification column 10.

When porous piston 17 reaches the end of its backstroke, its direction of travel is reversed, and the piston then commences its compression stroke. Upon commencement of the compression stroke of piston 17, cam 62 operates so as to open switch 61. Figures 3 and 4 show the manner in which the cam and switch cooperate during the compression stroke of piston 17. In Figure 3 cam 62 is in contact with the switch arm of switch 61 so as to maintain the switch in an open position during the piston compression stroke. At about the end of the compression stroke of the column piston, as shown in Figure 4, cam 62 breaks contact with the switch arm of switch 61, and the switch remains in an open position.

When piston 17 commences its compression stroke and switch 61 is thereby moved to an open position by cam 62, current is no longer supplied to the solenoids of valves 56 and 57, and the valves return to their normally closed positions. Feed material is as a result no longer supplied to chiller 38, and mother liquor is no longer removed from filter 48 through conduit 52. And since valves 56 and 57 remain closed during the entire compression stroke of piston 17 by reason of switch 61 being open during this same period, no pre-filtering occurs, nor is any feed material introduced into the system during this part of the cycle of operation. As a result of operating in this manner, pre-filtering of the crystal slurry occurs only during the backstroke of the column piston and under the pressure supplied by the feed pump. By filtering cyclically as described rather than continuously and during the piston compression stroke when the back pressure within the filter would be great, it is possible to substantially eliminate the occurrence of filter stoppages.

Piston 17 on its compression stroke compresses the crystal slurry which entered the column during the backstroke of the piston. By compressing the crystal slurry, additional mother liquor is squeezed out and passes through the screen of the piston for removal from the upper end of the column through line 26. The compact mass of crystals formed as a result of compressing the crystal slurry is moved through the column toward the melting zone maintained therein by heating means 13 as a temperature at least as high as the melting point of the crystals. The crystals on entering the melting zone are melted, and a portion of the resulting melt is passed into the moving mass of crystals. In contacting the crystals, the melt displaces occluded impurities from the crystals, which pass through the column and the porous piston and are finally removed from the column through line 26. The remainder of the melt is withdrawn from the melting zone through line 14 as a purified product.

At the end of the compression stroke of piston 17, its direction of travel is reversed and the piston then commences its backstroke. At about the beginning of the piston backstroke, cam 62 contacts and closes switch 61 so that current can flow to the solenoids of valves 56 and 57. As described hereinabove, valves 56 and 57 are thereby opened, and feed material can now enter the chiller through line 36 and mother liquor can be withdrawn from the filter through line 52. As soon as piston 17 uncovers feed inlet opening 18, a thickened crystal slurry flows into the purification column, and the operation of the column is repeated as described hereinabove.

Figure 5:
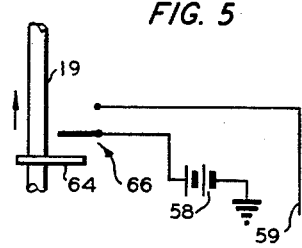
Figure 5 is a partial elevational view showing a modification of the control mechanism.

While the above described method of operation represents the preferred embodiment of the invention, other modifications can be practiced which clearly come within the scope of the invention. For example, referring to Figure 1, when pump 37 is a centrifugal pump or a pump such as a positive displacement pump provided with a bypass line, valve 56 may be omitted from the apparatus and replaced by a check valve adapted to prevent liquid flow from the chiller through line 36. No feed material is pumped into the chiller by such a pump so long as inlet opening 18 is blocked by porous piston 17. With this arrangement of apparatus, however, crystal slurry enters the column during a part of the piston compression stroke as well as during a portion of its backstroke. Since it is desired to remove mother liquor from filter 48 through line 52 during the period when the crystal slurry is entering the column, it becomes necessary in this embodiment of the invention to modify the control mechanism of Figure 1 somewhat so that valve 57 will be open during the aforementioned portions of the piston travel. In Figure 5 there is shown an arrangement of a suitable control mechanism for use with this modification of the invention. When porous piston 17 is on its backstroke and has started to uncover inlet opening 18, cam 64 contacts the switch arm of switch 66, thereby closing the switch and allowing electrical current to flow from battery 58 to the solenoid of valve 57. As a result valve 57 is opened, and mother liquor can be withdrawn from filter 51. Furthermore, as a result of uncovering inlet opening 18, pump 37 begins to pump feed material into chiller 43. These conditions of operation prevail until porous piston 17 on its compression stroke again blocks the inlet opening. At this time cam 64 again contacts the switch arm of switch 66, thereby opening the switch so that the solenoid of valve 57 is deenergized. Valve 57 is thereby closed so that mother liquor is no longer withdrawn from the filter through line 52. Also because of the closing of inlet opening 18, pump 37 no longer pumps feed into the chiller through line 36. This part of the cycle of operation continues until the porous piston on its backstroke again opens the column inlet opening. It is apparent that introduction of feed into the chiller and withdrawal of mother liquor from the filter occur only when the column inlet opening is uncovered by the column piston.

It is also within the scope of the invention to omit valve 57 from filter outlet conduit 52 while controlling the introduction of feed material into the chiller by means of valve 56. In this modification of the invention, the feed material is introduced into chiller 38 during such times as inlet opening 18 is unobstructed during the compression stroke and backstroke of piston 17, or only during the backstroke of the piston, as desired. Thus, either the control mechanism shown in Figure 1 or that shown in Figure 5 can be used to control the opening of valve 56 in accordance with the movement of the column piston. While mother liquor can flow from the filter through conduit 52 at all times, the introduction of feed material is allowed to occur only when the column inlet opening is uncovered by the column piston.

A more comprehensive understanding of the invention may be obtained by referring to the following illustrative example which is not intended, however, to be unduly limitative of the invention.

A feed material containing about 40 weight percent para-xylene is charged to the chiller of fractional crystallization apparatus similar to that of Figure 1 at a temperature of about 90° F. and at a rate of 1000 pounds per hour. The feed mixture is cooled in the chiller to a temperature of −62° F., causing para-xylene to crystallize and form a slurry containing 30 percent solids. The slurry is passed into the pre-filter where mother liquor containing 14.3 weight percent para-xylene is separated from the slurry at a rate of 300 pounds per hour. The resulting thickened slurry, still at about −62° F. and containing 43 percent solids is then passed into the purification column. During the above described operation, the porous column piston is on its backstroke, and the thickened slurry is introduced into the column so long as the piston is on its backstroke. As soon as the piston reaches the end of its backstroke and commences its compression stroke, introduction of feed material into the chiller and withdrawal of mother liquor from the pre-filter are terminated. The thickened slurry is compressed by the piston on its compression stroke squeezing out additional mother liquor, containing 14.3 weight percent para-xylene, which is passed through the porous piston and recovered from the upstream end, with respect to crystal movement, of the column at a rate of 395 pounds per hour. The resulting mass of crystals as a result of the force exerted thereon by the column piston moves through the column toward the melting zone maintained at a temperature above the melting point of the para-xylene crystals. A stream containing 98.6 weight percent para-xylene is withdrawn from the melting zone at a rate of 305 pounds per hour as a product of the process. After the completion of the compression stroke of the column piston, the piston backstroke commences so that feed material is again charged to the chiller and mother liquor is again withdrawn from the filter. The cycle of operation is then repeated as described hereinabove.

It will be apparent to those skilled in the art that various modifications of the invention can be made upon study of the accompanying disclosure. Such modifications are believed to be clearly within the spirit and scope of the invention.

I claim:

1. In a process for separating a component from a liquid multicomponent feed mixture which comprises introducing said feed mixture into a cooling zone; cooling said feed mixture in said cooling zone so as to crystallize at least a portion of one of the components of said feed mixture; passing the resulting slurry of crystals in mother liquor into a filtering zone; withdrawing mother liquor from said filtering zone; passing the resulting thickened crystal slurry into a purification zone; cyclically compressing said thickened crystal slurry so as to squeeze out mother liquor and move the resulting compact mass of crystals through said purification zone into a melting zone; melting crystals in said melting zone; passing a portion of the resulting melt into said moving crystals so as to displace occluded impurities therefrom; removing mother liquor and occluded impurities from an upstream portion, with respect to crystal movement, of said purification zone; and recovering a purified product from said melting zone, the improvement comprising introducing said feed mixture into said cooling zone and withdrawing mother liquor from said filtering zone only during the period when compression of said crystals within said purification zone is terminated and terminating flow of feed mixture into said cooling zone and flow of mother liquor from said filtering zone prior to the beginning of each compression cycle and throughout the period when compression of said crystals within said purification zone is taking place.

2. A process for separating a component from a liquid multicomponent feed mixture comprising introducing said mixture into a cooling zone; cooling said mixture in said cooling zone so as to crystallize at least a portion of one of the components of said mixture; passing the resulting slurry of crystals in mother liquor into a filtering zone; withdrawing mother liquor from said filtering zone; passing the resulting thickened crystal slurry into a purification zone; cyclically compressing said thickened crystal slurry so as to squeeze out mother liquor and move the resulting compact mass of crystals through said purification zone into a melting zone; terminating the introduction of feed mixture into said cooling zone and the withdrawal of mother liquor from said filtering zone prior to the beginning of each compression cycle and throughout the period when compressing said crystals within said purification zone; melting crystals in said melting zone; passing a portion of the resulting melt into said moving crystals so as to displace occluded impurities therefrom; removing mother liquor and occluded impurities from an upstream portion, with respect to crystal movement, of said purification zone; withdrawing melt from said melting zone as purified product; terminating the compression of said crystals within said purification zone; and introducing said feed mixture into said cooling zone and withdrawing mother liquor from said filtering zone only during the period when the compression of said crystals within said purification zone is terminated.

3. The process of claim 2 in which said multi-component mixture comprises alkylbenzenes.

4. The process of claim 3 in which said mixture contains para-xylene and said para-xylene is recovered as the product.

5. The process of claim 2 in which said multi-component mixture comprises benzene and a paraffinic hydrocarbon, and benzene is recovered as the product.

6. The process of claim 2 in which said multi-component mixture comprises cyclohexane and a paraffinic hydrocarbon, and cyclohexane is recovered as the product.

7. A process for separating a component from a liquid multi-component feed mixture which comprises introducing said mixture into a cooling zone; cooling said mixture in said cooling zone so as to crystallize at least a portion of one of the components of said mixture; passing the resulting slurry of crystals in mother liquor into a filtering zone; withdrawing mother liquor from said filtering zone; passing the resulting thickened crystal slurry through a slurry transfer zone into a purification zone; advancing a reciprocating filter zone through said purification zone, utilizing said reciprocating filter zone to compress said thickened crystal slurry and move the resulting compact mass of crystals through said purification zone into a melting zone; separating mother liquor from said thickened slurry by passing same through said reciprocating filter zone during the advancement of said zone; terminating the introduction of said mixture into said cooling zone and the withdrawal of mother liquor from said filtering zone prior to the beginning of and during the advancement of said reciprocating filter zone through said purification zone; melting crystals in said melting zone; passing a portion of the resulting melt into said moving crystals so as to displace occluded impurities therefrom; removing mother liquor and displaced occluded impurities from an upstream portion, with respect to crystal movement, of said purification zone through said reciprocating filter zone; recovering melt from said melting zone as purified product; withdrawing said reciprocating filter zone through said purification zone, thereby terminating the compression of said crystals; and introducing said feed mixture into said cooling zone and removing mother liquor from said filtering zone only during the withdrawal of said reciprocating filtering zone.

8. Fractional crystallization apparatus comprising, in combination, a closed purification column; means for melting crystals in one end of said column and outlet means for withdrawing a purified product therefrom; a reciprocable, porous piston in the opposite end of said column; means for reciprocating said piston within said column; means for removing from said column liquid passing through said piston; means for cooling liquid mixtures; outlet means connected to said cooling means; feed inlet conduit means connected to said cooling means; a first flow control means in said feed inlet conduit means; filtering means connected to said outlet means of said cooling means and to an intermediate portion of said column; mother liquor outlet conduit means connected to said filtering means; a second flow control means in said outlet conduit means; and means responsive to the movement of said piston for controlling said first and second flow control means so that said latter means allow flow of liquid therethrough only during the backstroke of said piston.

9. Fractional crystallization apparatus comprising, in combination, a closed purification column; means for melting crystals in one end of said column and outlet means for withdrawing a purified product therefrom; a reciprocable, porous piston in the opposite end of said column and outlet means for withdrawing liquid therefrom; means for reciprocating said piston within said column; means for cooling liquid mixtures; outlet means connected to said cooling means; feed inlet conduit means connected to said cooling means; a first valve means in said feed inlet conduit means; filtering means connected to said outlet means of said cooling means and to an intermediate portion of said column; mother liquor outlet conduit means connected to said filtering means; a second valve means in said outlet conduit means; and means for actuating said first and second valve means in response to the movement of said piston so that said valve means are in an open position only during the backstroke of said piston.

References Cited in the file of this patent

UNITED STATES PATENTS

| 2,617,274 | Schmidt | Nov. 11, 1952 |
| 2,747,001 | Weedman | May 22, 1956 |
| 2,752,230 | Findlay | June 26, 1956 |
| 2,794,840 | Vela | June 4, 1957 |